Aug. 6, 1929.  A. V. LIVINGSTON  1,723,282
VEHICLE DRIVING APPARATUS AND SYSTEM
Filed April 11, 1925
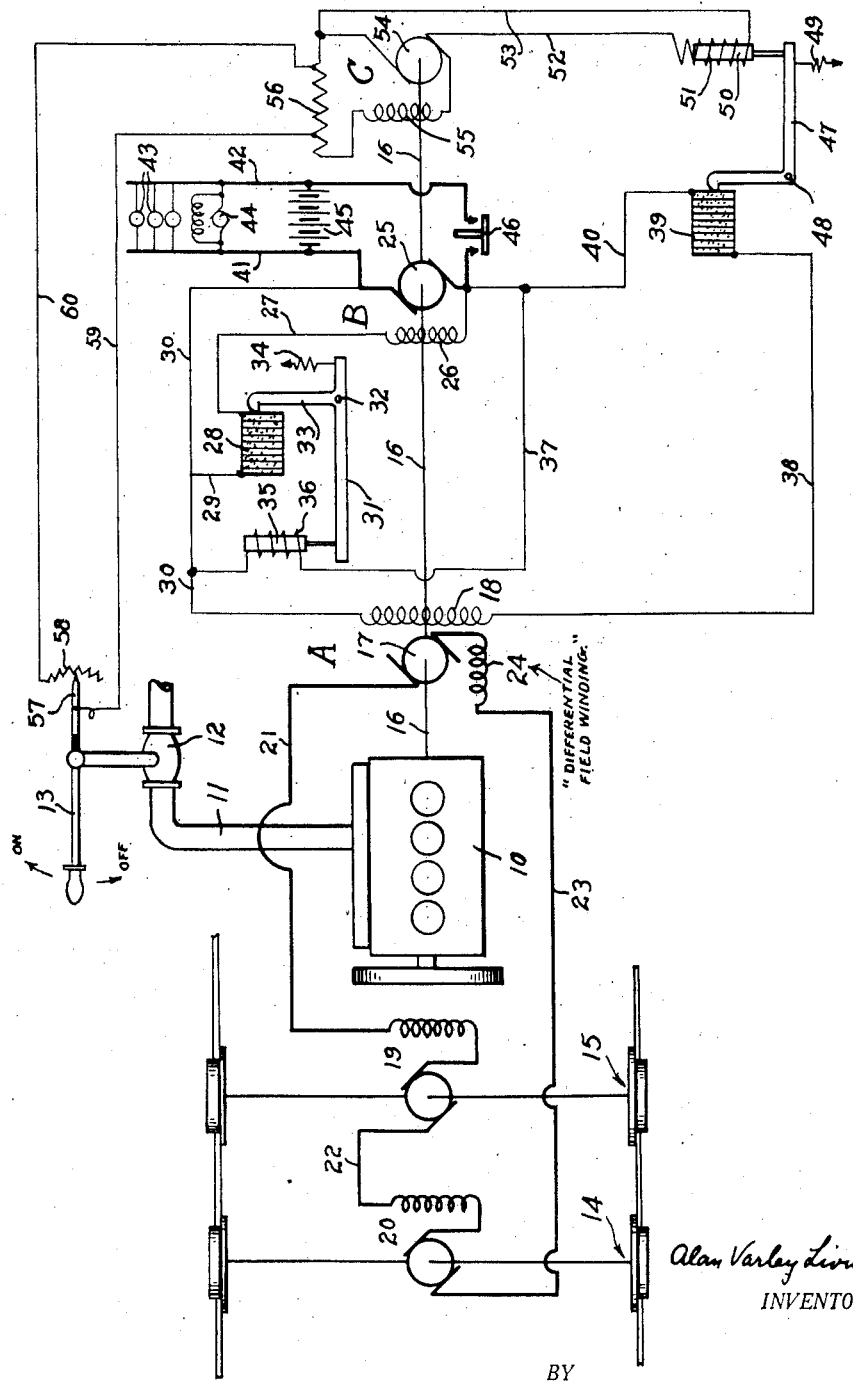
Alan Varley Livingston
INVENTOR.
BY
Robert S. Blair
ATTORNEY.

Patented Aug. 6, 1929.

1,723,282

UNITED STATES PATENT OFFICE.

ALAN VARLEY LIVINGSTON, OF NEW HAVEN, CONNECTICUT, ASSIGNOR TO THE SAFETY CAR HEATING & LIGHTING COMPANY, A CORPORATION OF NEW JERSEY.

VEHICLE DRIVING APPARATUS AND SYSTEM.

Application filed April 11, 1925. Serial No. 22,377.

This invention relates to power transmissions and more particularly to the transtransmissions of power from a prime mover to the driving wheels or axles of a vehicle, such as a locomotive, for example.

One of the objects of this invention is to provide a practical and rugged apparatus for transmitting power from a prime mover to the driving wheels or axles of a vehicle, of dependable operation and high efficiency of action. Another object is to provide a power transmission of the above-mentioned nature that will be capable of dependable and efficient action irrespective of variations in speed or load imposed upon the apparatus. Another object is to provide a system and apparatus for transmitting power from a prime mover to a load in which a high degree of efficiency of transmission is automatically attained irrespective of varying conditions imposed thereon by the load itself or by the prime mover. Another object of this invention is to provide an electrical system and apparatus for power transmission in which automatic action and control to attain high efficiency of operation may be achieved without sacrifice of simplicity of arrangement and dependability of operation. Another object is to provide a system and apparatus of the above-mentioned nature particularly adapted to the transmission of power from a prime mover to the driving wheels or axles of a vehicle, such as locomotive, for example, and in which the varying and hard conditions of practical use may be met in a thoroughly practical, dependable and efficient manner. Another object of this invention is to provide an electrical apparatus and system for transmitting power from a prime mover to the wheels or axles of a vehicle which will be capable not only of meeting adequately and efficiently the widely varying conditions imposed by the character of the load, but also of dependably and efficiently meeting the practical requirements of auxiliary apparatus and electrical circuits or devices in which substantial constancy of supply of energy is a prerequisite as distinguished from the variability of the requirements of the load. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

As conducive to a clearer understanding of certain features of this invention, it may at this point be noted that there are a number of highly desirable practical advantages in the use of a prime mover such as an internal combustion engine to be operated by gas or oil, as a source of energy for driving vehicles such as locomotives for railway service; but the conditions of speed and magnitude of the load imposed upon the prime mover by the vehicle driven thereby are subject to such wide variations and changes in character that the achievement of such advantages as are noted above are attendant with much difficulty and with sacrifice of efficiency. One of the dominant aims of this invention is to provide a system and apparatus wherein these advantages may be achieved in a thoroughly practical manner while maintaining a high degree of efficiency of operation irrespective of the changing characteristics of the load upon the system.

The invention accordingly consists in the features of construction, combinations of elements, and arrangements of parts as will be exemplified in the structure to be hereinafter described and the scope of the application of which will be indicated in the following claims.

In the single figure of the accompanying drawing there are shown diagrammatically the apparatus and circuit arrangements illustrative of one of the various possible embodiments of this invention.

Referring now to the drawing, there is shown at 10 a prime mover preferably in the form of a gas or oil internal combustion engine; the latter is adapted to be supplied with appropriate fuel from any convenient source, as by the conduit 11, the latter being provided with a throttle 12 for controlling at will the supply of fuel to the prime mover 10, and hence to control the power output of the latter. The throttle or valve 12 is provided with the handle 13 for manual control thereof. The prime mover 10 and its associated apparatus may be mounted in any suitable manner upon the vehicle to be driven, only two pairs of wheels and associated axles 14 and 15 of the latter being shown in the drawing, for the sake of simplicity of illustration.

The prime mover 10 is provided with a driving shaft diagrammatically shown at 16, and operatively driven from the shaft 16 is the armature 17 of a generator generally indicated at A. The generator A is provided with an exciting field winding energized or excited preferably in a manner more clearly set forth hereinafter, and the output of the generator A supplies energy for driving one or more motors connected to the load to be driven, as, for example, connected to one or more of the axles or wheels of the vehicle. Thus, at 19 is diagrammatically indicated a motor operatively connected to the axle 15, and at 20 is indicated a motor connected to the axle 14. The motors 19 and 20 may take any suitable or appropriate form, and by way of illustration are shown in the drawing as being of the series type. If more than one driving motor is employed, for example, the two motors 19 and 20, as shown in the drawing, the motors may be connected to the generator A in any suitable or appropriate manner and in the drawing are illustratively shown as serially connected. Thus a conductor 21 leads the current output of the generator A to the motor 19, the current thence passing through the motor 19, then by way of conductor 22 to motor 20, and through the motor 20 and thence by way of conductor 23 back to the generator A. Preferably the generator A, to achieve certain advantages hereinafter described, is provided, in addition to the exciting field winding 18, with a differential field winding, and in the drawing the latter is indicated at 24 and as will be clear from the drawing, it will be seen that the current passing from the genreator into or through the motor circuit or circuits passes through this differential field winding 24. The output energy of the generator A will thus be seen to be directly transmitted to the driving motors, and with this arrangement it will further be seen that simplicity of arrangement and absence of switching and control devices may be achieved.

Considering now the manner in which the exciting field winding 18 of the generator A is energized, it will be noted first that driven from the prime mover 10 and preferably connected directly thereto, as through the extended driving shaft thereof, is an exciter generator generally indicated at B, and as shown in the drawing the armature 25 of the exciter generator B is directly connected to the driving shaft 16 of the prime mover 10. The exciter generator B is preferably of the shunt wound type, and is hence provided with a shunt field winding 26; the circuit of this shunt winding 26 will be seen to extend from one terminal of the armature 25 of the generator B, thence through the field winding 26, and by way of conductor 27 through a variable resistance, taking the form preferably of a compressible carbon pile 28, and thence by way of conductors 29 and 30 back to the other terminal of the generator B.

The carbon pile 28 has associated with it a bell crank lever 31, pivoted as at 32, and provided with an upwardly extending arm 33 which bears against the free or unanchored end of the carbon pile 28. The spring 34 appropriately connected to the lever 31 tends to swing the lever 31 about its pivot 32 in such a direction that the compression of the carbon pile 28 is increased. At one end of the lever 31 there is connected a core 35 forming part of a solenoid, the coil 36 of which is connected by conductors 30 and 37 to the respective terminals of the armature 25 of the exciter generator B. With the arrangement thus far described in connection with the exciter generator B, the voltage of the output of the generator B will be maintained substantially constant irrespective of changes in the speed of drive of the armature 25 of the generator B, due to changes in the speed of the prime mover or internal combustion engine 10. A tendency to raise the voltage of the exciter generator B, due to an increase in the speed of the generator, is at once met by an increase in the resistance of the carbon pile 28 with a consequent and commensurate decrease in the exciting field current of the generator B. A decrease in speed of the exciter generator B will bring about a reverse action, and thus constancy of voltage of the output of the exciter generator B will be seen to be maintained. The voltage of the output of the generator B is such that it is sufficient to supply the exciting field winding 18 of the main generator A with ample excitation and to meet the maximum requirements in this respect of the main generator A.

The exciter generator B supplies exciting current to the field winding 18 through a circuit which will be seen to extend from one terminal of the generator B, thence by way of conductor 30 to one terminal of the main field winding 18 of the generator A, through the winding 18 and thence by way of conductor 38 a variable resistance 39 preferably in the form of a carbon pile and conductor 40 to the other terminal of the generator B.

Before considering in detail the control of the excitation supplied to the field winding 18 of the generator A, it may at this point be noted that apparatus of this general nature must be and usually is equipped with various auxiliary apparatus and devices; the latter may include motors for driving air compressors to supply air to the air-brake system of the vehicle or train, or for supplying air under pressure to the prime mover for various purposes, motors for driving blowers for the air cooling of any of the electrical or mechanical equipment, and such additional or auxiliary devices may also include a lighting circuit for illumination of the vehicle or train. Also, various control devices may be electrically operated, and in order to insure the supply of energy to certain or all of the auxiliaries mentioned hereinabove by way of example, when the prime mover is at rest, I provide a storage battery which may be charged while the prime mover is operating, and may form the supply of energy to those devices when the prime mover is at rest. Such apparatus or devices either require a constant voltage supply of electrical energy and particularly in the case of storage battery, such a supply of energy is of material advantage in insuring the proper charge of the battery and protect the latter against overcharge. As hereinbefore noted, the exciter generator B I have arranged to have controlled so that its output is of substantially constant voltage, and I make this generator B of sufficient capacity to supply energy to such auxiliaries as are mentioned above.

Turning to the drawing, I have shown diagrammatically and by way of example a power circuit including the conductors 41 and 42, connected to the terminals of the exciter generator B; to this power circuit 41—42 and hence to the exciter generator B, may be connected, to be supplied with energy therefrom, the various auxiliary devices or apparatus. Among the latter, I have shown by way of example a series of lamps 43, a motor 44 of any suitable type, as illustrative of a possible auxiliary prime mover for driving a compressor or blower, for example, and a storage battery 45. The substantially constant voltage of the energy supplied by the exciter generator B permits not only the operation of auxiliary prime movers at a voltage most appropriate thereto and hence at their intended efficiency, but also insures an adequate charging of the battery 44 and the automatic safeguarding of the latter against overcharge. The lamps 43 which are illustrative of the lighting circuit of either the vehicle or train as a whole, may furthermore be thus supplied with energy at substantially constant voltage, and as to all of the auxiliary translating devices associated with the power circuit 41—42, it will be seen that the battery 45 may function as the source of energy supply thereto during periods of inactivity of the prime mover 10 and hence of the generator B. Any suitable form of automatic switch diagrammatically shown at 46 may be employed to connect or disconnect the generator B to the power circuit 41—42 in accordance with the activity or inactivity respectively of the generator B.

Considering now in detail the control of the excitation of the winding 18 of the main generator A, it is first to be noted that the free or unanchored end of the carbon pile 39, which is arranged to control the flow of exciting current in the field winding 18, has related to it a bell crank lever 47, pivoted as at 48, a spring 49 being connected to the lever 47 so as to tend to swing the lever 47 in clockwise direction and thus to relieve the pressure on the carbon pile 39. Connected to the lever 47, however, is a core 50 of a solenoid, the winding 51 of which is connected as by conductors 52 and 53 across the terminals of the armature 54 of an auxiliary generator C arranged to be driven by the prime mover 10 and conveniently connected to the shaft 16 thereof. The armature 54 will thus partake of whatever variations in speed or tendencies to vary in speed which will be inherent in the operation of the prime mover 10.

The generator C, which may be of relatively small capacity, may be of any suitable form or type, and very conveniently takes the form of a shunt wound direct current generator. There is accordingly provided for the generator C a shunt field winding 55 connected across the terminals of the armature 54, but preferably through a suitable resistance 56. The auxiliary generator C will thus be seen to be self-excited.

As already hereinbefore noted, the power output of the prime mover 10 may be controlled as by the lever 13 which in turn controls the valve 12 which in turn controls, for example, the flow of fuel to the internal combustion engine 10. Associated with the lever 13 is a current-controlling device, preferably in the form of a resistance, arranged to be varied as the lever 13 is moved. Thus, for example, the lever 13 may carry a contact member 57 arranged to coact with a resistance 58, this current-controlling device 57—58 being shunted about a portion of the resistance 56 as by the conductors 59 and 60; and the several parts are so arranged that as the lever 13 is moved to increase the supply of fuel to the prime mover 10, the resistance of the field circuit of the auxiliary generator C is increased, and in the particular arrangement shown in the drawing, such a movement of the lever 13 increases the amount of resistance 58 which is shunted around the resistance 56, thus to cause a decrease in the excitation of the generator C and therefore to necessitate a slightly greater speed of rotation of the armature 54 thereof to cause the voltage of the generator C to return to its normal or intended value. As above noted, the output of the auxiliary generator C is supplied to the winding 51 of the solenoid 50—51 which controls the carbon pile 39; the movable parts of the solenoid 50—51 and its magnetic circuit are constructed in any suitable manner so that at any point within the intended range of movement of the movable core 50, the latter will remain in equilibrium when the normal or intended voltage of the auxiliary generator C is impressed upon the coil 51 of the solenoid.

The auxiliary generator C, moreover, is preferably so constructed as to be relatively sensitive to speed changes and its field circuit is preferably so constructed, as to resistance thereof, that the desired or normal voltage will be produced across the terminals of the generator at substantially the lowest speed at which the prime mover is to be run when delivering power to the load, and the generator is further so constructed that under these conditions it is operating adjacent the upper end of its saturation curve, but not past the bend or knee in the curve. Operating thus on substantially a straight line portion of this saturation curve, the generator will cause a substantial change in voltage to take place in its output for a relatively slight change in speed.

Considering now the operation of the apparatus and system, it may first be pointed out that efficiency of transmission of power from the prime mover 10 to the load is dependent to a substantial extent upon the speed of the prime mover itself, and to maintain the desired efficiency of transmission, a corresponding speed of rotation of the internal combustion engine should be maintained. For example, the load imposed upon the prime mover 10 by the vehicle being driven, is subject to wide variations, and inasmuch as it is desired to control the locomotive or vehicle being driven in such a simple manner as is made feasible by the use of the throttle lever 13 alone, it is not infrequent that conditions will often arise where the prime mover 10 becomes overloaded. Such overloading reduces the speed of the internal combustion engine and aside from detrimentally affecting the driving of the load itself results further in a substantial loss in power even though the supply of fuel to the engine be increased as by opening further the throttle valve 12. Thus, conditions of great inefficiency may easily and readily be brought about.

By way of illustration, it may be here noted that should the vehicle locomotive or train driven thereby be moving on an up grade, so that the load on the system and apparatus is not only substantial but also of gradually increasing value, the failure of the internal combustion engine to "pick up" rapidly enough brings about the conditions briefly outlined hereinabove. With the system and apparatus of my invention, however, these defects and disadvantages are effectively avoided and a high degree of efficiency may be maintained substantially automatically throughout the varying conditions of load imposed upon the internal combustion engine.

Assuming the prime mover 10 to be in operation, and the generator A supplying current to the motors 19 and 20 driving the load, and assuming substantially constant conditions of load, the prime mover 10 will be operating at its intended speed, a speed which may be inherent in the design of the prime mover itself. Under these conditions, the exciter generator B will be supplying energy at substantially constant voltage to the power circuit 41—42, and will also be supplying exciting current to the field winding 18 of the main generator A. But the magnitude of the exciting current flowing to the field winding 18 will be under the control of the carbon pile 39, which is in turn controlled by the auxiliary generator C; the generator C, preferably embodying the characteristics already noted hereinabove, will, at the speed imposed upon it by the intended normal speed of the internal combustion engine 10, and under the above-assumed conditions of substantial constancy of load, so affect the carbon pile 39 through the solenoid winding 51 that the intended excitation of the generator A necessary for it to supply current to the driving motors will be supplied the field winding 18.

Assuming now that the load on the driving motor or motors 19—20 is increased, as, for example, by reason of the vehicle or locomotive meeting an up grade in its path of travel, such a condition at once tends to impose a greater load upon the generator A and hence upon the prime mover 10, resulting in a tendency for the speed of the internal combustion engine 10 to decrease. But the increased current flowing to the driving motors decreases the excitation of the generator A by its action thereon through the differential field winding 24, so that the voltage of the generator A is reduced to some extent and correspondingly its energy output; thus the increased load on the prime mover 10 may be in part relieved. But the decrease in speed of the generator A, due to the increasing load, even if slight, causes a corresponding reduction in the speed of the armature 54 of the auxiliary generator C, so that the voltage of the latter meets with a prompt and substantial decrease. This decrease in voltage weakens the winding 51 of the solenoid 50—51, and thus permits the spring 49 to preponderate, so as to swing the lever 47 slightly in clockwise direction and decrease the pressure on the carbon pile 39. Such a decrease in pressure on the pile 39 increases the resistance of the latter and hence decreases the amount of exciting current supplied to the main field winding 18 of the generator A. This action in turn results in further decreasing the voltage of the generator A and hence its energy output, and thus the load upon the prime mover 10 is further diminished. This decrease in the load on the prime mover 10 prevents the speed of the latter from decreasing further, and in fact permits the speed of the prime mover 10 to regain its normal value, and as soon as the decreased load on the prime mover 10 has permitted the speed thereof to increase again to its normal value, the return to normal speed of rotation of the armature 54 of the auxiliary generator C permits the voltage of the latter to assume at once a control of the carbon pile 39 and to prevent an increase in speed of the prime mover 10 beyond its normal value.

Thus, for example, should the speed of the prime mover 10 and hence of the auxiliary generator C tend to increase beyond normal value, the resultant increase in voltage of the generator C so strengthens the winding 51 of the solenoid 50—51 that the resistance of the carbon pile 39 is at once decreased, the excitation current flowing to the winding 18 of the generator A is increased and the resultant increase in the output of the generator A imposes the necessary increase in load on the prime mover 10 to bring the speed of the latter back to normal.

Thus, the intended or normal speed of the prime mover 10 may be automatically attained so that its intended efficiency may be reliably realized, but the maintenance of substantial constancy of speed of the internal combustion engine 10, achieves a further and very desirable practical advantage. As the driven load increases, as by reason of the vehicle or train ascending a grade, it is of course desired to increase the fuel input to the engine 10 as by opening further the throttle valve 12. The increase of the fuel input to the engine 10 may thus be made at once and promptly effective, inasmuch as the engine 10 has its speed maintained substantially constant, and the danger of giving rise to a condition where the engine fails to "pick up" at the exact moment when great power output, as well as highest efficiency of operation thereof, are most essential, is effectively precluded.

But in order to achieve more effectively the advantages just outlined above, I have caused the further opening of the throttle valve 12 (as by increasing the value of the shunt resistance 56 in the field circuit of the generator C) when it is desired to meet the conditions of increased or increasing load, to decrease the excitation of the auxiliary generator C, thus to cause a decrease in the voltage of its output analogous to a decrease in speed of the engine 10 itself. This decreased voltage of the auxiliary generator C causes a weakening of the coil 51 of the solenoid 50—51 and by the resultant action as already hereinbefore outlined, the excitation current supplied to the field winding 18 of the generator A is decreased, and the resultant decrease in the output of the generator A permits at once a substantial increase in speed of the engine 10 to take place.

Thus, I am enabled to place the engine 10, as by causing an increase in the speed thereof, in more effective condition to respond more promptly to the increase in the fuel supply and thus I am enabled to insure the prompt increase in output of the prime mover 10 to supply the increasing load at exactly the moment when the demand for more power output should be effectively and promptly met. And by making the shunt resistance 58 gradually variable in accordance with the degree of movement of the throttle lever 13, I may in a simple and highly effective manner cause an increase in the speed of the prime mover 10 to take place as demands for greater power output thereof are made, and I may so proportion the change in the excitation of the auxiliary generator C, by the throttle lever 13, that any desired or intended power output-speed characteristic of the internal combustion engine 10 may be achieved, and moreover, it will thus be seen that I am enabled to match very closely this characteristic of the engine 10 with the output characteristic of the main generator A which supplies the load. Thus, a high degree of efficiency may be effectively and dependably achieved throughout the widely varying conditions of load imposed upon the system and apparatus.

Throughout whatever variations of speed that take place in the prime mover 10 or in the apparatus driven therefrom, it will be noted that the generator B will have the voltage of its output maintained substantially constant by the apparatus hereinbefore described, and thus the auxiliary devices supplied therefrom as by the power circuit 41—42 may be supplied with a substantially constant voltage and may thus be operated at their intended characteristics or efficiency.

As hereinbefore described, I prefer to include in the system and apparatus the differential field winding 24 associated with the main generator A; while thoroughly practical and advantageous results may be achieved without the use of this differential field, yet I prefer to utilize its action in that it coacts in an efficient way with the auxiliary control or regulating apparatus and moreover in such a manner as to decrease the necessity for a wide range of action of the latter; the latter devices may thus be made of smaller capacity and with the coaction of the differential field 24 may achieve a smooth and dependable operation.

It will be understood that any desired switching or control devices may be interposed between the main generator A and the motor or load supplied thereby, such as appropriate devices for connecting and disconnecting the motors or load to or from the generator as may be desired; for the sake of simplicity, however, I have not illustrated such devices in the drawing as well as for the purpose of more clearly showing by way of example how the demands of the load may be efficiently met through the simple and advantageous arrangement of controlling the power output of the internal combustion engine, as by means of the throttle valve associated therewith.

It will thus be seen that there has been provided in this invention a system and apparatus for the transmission of energy in which the several objects hereinbefore noted, as well as many thoroughly practical advantages, are successfully achieved; it will further be seen that the apparatus is well adapted to meet the widely varying conditions of hard practical use.

As many possible embodiments may be made of the above invention, and as many changes might be made in the embodiment above set forth, it is to be understood that all matter hereinbefore set forth or shown in the accompanying drawings, is to be interpreted as illustrative and not in a limiting sense.

I claim as my invention:

1. In apparatus of the character described, in combination, an internal combustion engine, a generator driven thereby, means forming an electrical load for receiving energy from said generator, an exciter for supplying excitation current to said generator, means for controlling the excitation current supplied to said generator, and means responsive to speed changes of said engine for operating said controlling means.

2. In apparatus of the character described, in combination, an internal combustion engine, a generator driven thereby, means forming an electrical load for receiving energy from said generator, an exciter for supplying excitation current to said generator, a regulating device for controlling the flow of excitation current from said exciter, and means responsive to the speed of said engine for operating said regulating device.

3. In apparatus of the character described, in combination, an internal combusion engine, a generator driven thereby, means forming an electrical load for receiving energy from said generator, an exciter for supplying excitation current to said generator, a regulating device for controlling the flow of excitation current from said exciter, means having an effective voltage varying in substantial accordance with the speed of said engine for controlling said regulating device, and means adapted at will to permit a change of standard in operation of said last-mentioned means.

4. In apparatus of the character described, in combination, an internal combustion engine, a generator driven thereby, means forming an electrical load for receiving energy from said generator, an exciter for supplying excitation current to said generator, a regulating device for controlling the flow of excitation current from said exciter, an auxiliary generator connected to have its output vary substantially in accordance with the speed of said engine, and means responsive to changes in output of said auxiliary generator for operating said regulating device.

5. In apparatus of the character described, in combination, an internal combustion engine, a generator driven thereby, means forming an electrical load for receiving energy from said generator, an exciter for supplying excitation current to said generator, means for controlling the power output of said engine, means adapted upon an increase in the said load to prevent increase in the output of said generator, and means responsive to operation of said control means, when the latter is operated to increase the power output of said engine, to cause an increase in the speed of said engine to take place.

6. In apparatus of the character described, in combination, an internal combustion engine, a generator driven thereby, means forming an electrical load for receiving energy from said generator, an exciter for supplying excitation current to said generator, means for controlling the power output of said engine, means driven by said engine and having an output varying substantially in accordance with the speed of said engine, means controlled by said last-mentioned means operative upon a decrease in speed of said engine to decrease the power output of said generator, and means responsive to the operation of said control means for changing the standard of operation of said speed responsive means.

7. In apparatus of the character described, in combination, an internal combustion engine, a generator driven thereby, means forming an electrical load for receiving energy from said generator, means for controlling the power output of said engine, means forming an auxiliary electrical load, a generator adapted to supply energy to said auxiliary load, means for maintaining substantially constant voltage on said auxiliary load, means responsive to the speed of said engine arranged to decrease the output of said main generator as an increasing load thereon tends to reduce the speed of the engine, and means responsive to the operation of said control means for changing the standard of operation of said speed responsive means.

8. In apparatus of the character described, in combination, an internal combustion engine, a generator driven thereby, means forming an electrical load for receiving energy from said generator, means for controlling the power output of said engine, means forming an auxiliary electrical load, a generator adapted to supply energy to said auxiliary load, means for maintaining substantially constant voltage on said auxiliary load, a control generator driven by said engine and arranged to have a function of its output vary substantially in accordance with the speed of said engine, means responsive to a decrease in a function of the output of said control generator adapted to decrease the excitation of said main generator as an increasing load on the latter tends to reduce the speed of said engine, and means responsive to the operation of said control means for changing the standard of operation of said control generator.

9. In apparatus of the character described, in combination, a prime mover, a generator driven thereby, a motor supplied with energy from said generator, means forming a variable load and driven by said motor, whereby with a given output of said prime mover, changes in said load will affect the speed of said prime mover, a regulating generator driven by said prime mover and having a function of its output vary substantially with its speed, a variable resistance for controlling the output of said main generator, and a coil for controlling said variable resistance and responsive to changes in the said functions of the output of said regulating generator.

10. In apparatus of the character described, in combination, a prime mover, a generator driven thereby, means forming an electrical load for receiving energy from said generator, a regulating generator driven by said prime mover and arranged to have its output vary substantially with its speed, means responsive to changes in output of said regulating generator for controlling the output of said main generator, and means for changing the standard of operation of said regulating generator.

11. In apparatus of the character described, in combination, a prime mover, a generator driven thereby, means forming an electrical load for receiving energy from said generator, a regulating generator driven by said prime mover and arranged to have its output vary substantially with its speed, a variable resistance for controlling the output of said main generator, a coil for controlling said variable resistance and responsive to changes in output of said regulating generator, and means for changing the standard of operation of said regulating generator.

12. In apparatus of the character described, in combination, a vehicle carrying an internal combustion engine and a generator driven thereby, a motor for driving said vehicle and supplied with energy from said generator, means for controlling the output of said generator so as to maintain substantially constant the speed of said engine, means arranged to permit an increase in the output of said engine, and means responsive to operation of said last-mentioned means adapted to cause the speed of the engine to increase.

13. In apparatus of the character described, in combination, a vehicle carrying an internal combustion engine and a generator driven thereby, a motor for driving said vehicle and supplied with energy from said generator, control means arranged to permit the output of said engine to be increased, means responsive to an increase in the load on said motor for preventing the speed of the engine from decreasing, and means responsive to the operation of said control means for changing the standard of operation of said last-mentioned means.

14. In apparatus of the character described, in combination, a vehicle carrying an internal combustion engine and a generator driven thereby, said generator having an excited excitation circuit, a motor for driving said vehicle and supplied with energy from said generator, means driven by said engine and arranged to have its output vary substantially in accordance with the speed of said engine, and means responsive to changes in the output of said last-mentioned means adapted to substantially correspondingly change the voltage of said generator.

15. In apparatus of the character described, in combination, a vehicle carrying an internal combustion engine and a generator driven thereby, said generator having an excited excitation circuit, a motor for driving said vehicle and supplied with energy from said generator, an auxiliary generator driven by said engine and arranged to have a function of its output vary substantially with the speed of said engine, and means responsive to a change in the function of said output arranged upon a decrease in the speed of said engine to decrease the voltage of said main generator.

16. In apparatus of the character described, in combination, a vehicle carrying an internal combustion engine and a generator driven thereby, a motor for driving said vehicle and supplied with energy from said generator, an auxiliary generator driven by said engine and arranged to have a function of its output vary substantially with the speed of said engine, means responsive to a change in the function of said output for decreasing the output of said first-mentioned generator as the speed thereof decreases due to an increase in load thereon, a throttle for controlling the fuel supply to said engine, and means responsive to the operation of said throttle adapted to change the standard of operation of said auxiliary generator.

17. In apparatus of the character described, in combination, a prime mover, a generator driven thereby, said generator having an excited excitation circuit, means forming an electrical load for receiving energy from said generator, means for controlling the power output of said generator, and means responsive to speed changes of said prime mover for operating said controlling means in a direction to increase the power output of said generator upon an increase in speed of said prime mover and in a direction to decrease the power output upon decrease in speed of said prime mover.

18. In apparatus of the character described, in combination, a prime mover, a load, variable power transmission means interposed therebetween, a generator driven by said prime mover so that said generator partakes of any variations in speed to which said prime mover is subjected, and means for maintaining a function of the output of said generator substantially constant and including means responsive to changes in a function of the output of said generator for controlling the effectiveness of said power transmission means.

19. In apparatus of the character described, in combination, an internal combustion engine having a power output-speed characteristic such that a change in its power output is accompanied by a change in its speed, a load supplied with energy from said engine, variable power transmission means including dynamo-electric machinery interposed between said engine and said load, means for affecting said power transmission means to change the energy transmitted thereby to said load, means responsive to the speed of said engine and operating upon said transmission affecting means for maintaining the speed of said engine substantially constant, and means for changing the standard of operation of one of said means to cause the maintenance of substantial speed constancy of said engine at a different speed.

20. In apparatus of the character described, in combination, an internal combustion engine having a power output-speed characteristic such that a change in its power output is accompanied by a change in its speed, a load supplied with energy from said engine, variable power transmission means including dynamo-electric machinery interposed between said engine and said load, means for changing the power output of said engine to permit the supply of a different amount of energy thereby to said load, means for affecting said power transmission means to vary the power transmitted thereby to said load, means responsive to the speed of said engine for operating upon said transmission affecting means for varying the power transmitted thereby to maintain the speed of said engine substantially constant, and means for changing the standard of operation of said last-mentioned means to cause said transmission means to transmit a different amount of energy to said load and to maintain substantial speed constancy of said engine at a different standard.

21. In apparatus of the character described, in combination, a prime mover, a load therefor, variable power transmission means interposed therebetween, a generator driven by said prime mover so that said generator partakes of any variations in speed to which said prime mover is subjected, means for maintaining a function of the output of said generator substantially constant, said means including means responsive to changes in a function of the output of said generator for controlling the effectiveness of said power transmission means, and means for changing the value at which said function of the output of said generator is maintained constant.

In testimony whereof, I have signed my name to this specification this seventh day of April, 1925.

ALAN VARLEY LIVINGSTON.